US006089081A

United States Patent [19]

Cook et al.

[11] Patent Number: 6,089,081

[45] Date of Patent: Jul. 18, 2000

[54] AUTOMOTIVE EVAPORATIVE LEAK DETECTION SYSTEM AND METHOD

[75] Inventors: John E. Cook; Paul D. Perry, both of Chatham, Canada

[73] Assignee: Siemens Canada Limited, Mississauga, Canada

[21] Appl. No.: 09/235,995

[22] Filed: Jan. 22, 1999

Related U.S. Application Data

[60] Provisional application No. 60/072,704, Jan. 27, 1998.

[51] Int. Cl.[7] .......... G01M 15/00

[52] U.S. Cl. .......... 73/118.1; 73/40; 73/49.7

[58] Field of Search .......... 73/39, 40, 46, 73/47, 49.7, 116, 117.2, 117.3, 118.1, 119 R

[56] References Cited

U.S. PATENT DOCUMENTS

| | | | |
|---|---|---|---|
| 5,263,462 | 11/1993 | Reddy | 123/520 |
| 5,295,472 | 3/1994 | Otsuka et al. | 123/520 |
| 5,437,257 | 8/1995 | Giacomazzi et al. | 123/520 |
| 5,826,566 | 10/1998 | Isobe et al. | 123/520 |
| 5,884,609 | 3/1999 | Kawamoto et al. | 123/520 |
| 5,911,209 | 6/1999 | Kouda et al. | 123/520 |

*Primary Examiner*—Eric S. McCall

[57] ABSTRACT

A method and apparatus for detecting leakage from an evaporative emission space (14, 18) of a vehicle fuel system by utilizing naturally occurring vacuum that can occur under certain favorable conditions after a fuel-consuming engine (12) that powers an automotive vehicle has been turned off. If there is no leakage, vapor pressure in the fuel system will begin to decrease. If it is assumed that the vapor pressure was approximately atmospheric when the engine was turned off, and that no leakage existed, ensuing cooling will create increasing vacuum in headspace of the fuel tank as the temperature drops. In the absence of leakage, a well-defined relationship exists. Measurements of physical parameters (24, 26) characterizing fluid conditions in the fuel tank are taken as cooling proceeds and processed. Results are evaluated to obtain leakage information.

32 Claims, 2 Drawing Sheets

AUTOMOTIVE EVAPORATIVE LEAK DETECTION SYSTEM AND METHOD

REFERENCE TO RELATED APPLICATION, INCORPORATION BY REFERENCE, AND PRIORITY CLAIM

This application expressly claims the benefit of earlier filing date and right of priority from the following commonly owned patent application: U.S. Provisional Application Ser. No. 60/072,704 filed on Jan. 27, 1998 in the names of John E. Cook and Paul D. Perry and entitled "AUTOMOTIVE EVAPORATIVE LEAK DETECTION SYSTEM". The entirety of that earlier-filed, co-pending patent application is hereby expressly incorporated herein by reference.

FIELD OF THE INVENTION

This invention relates generally to an on-board automotive evaporative leak detection system and method for detecting fuel vapor leakage from an evaporative emission space of an automotive vehicle fuel system, and more especially to a new and unique system and method for detecting leakage by utilizing naturally occurring vacuum that can occur under certain favorable conditions after a fuel-consuming engine that powers the vehicle has been turned off.

BACKGROUND OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake system of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake system through the canister purge valve. For example, fuel vapors may be purged to an intake manifold of an engine intake system by the opening of a CPS-type valve in response to a signal from the engine management computer, causing the valve to open in an amount that allows intake manifold vacuum to draw fuel vapors that are present in the tank headspace, and/or stored in the canister, for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then detecting a change in that substantially different pressure which is indicative of a leak.

It is believed fair to say that from a historical viewpoint two basic types of vapor leak detection systems for determining integrity of an evaporative emission space have evolved: a positive pressure system that performs a test by positively pressurizing an evaporative emission space; and a negative pressure (i.e. vacuum) system that performs a test by negatively pressurizing (i.e. drawing vacuum in) an evaporative emission space. The former may utilize a pressurizing device, such as a pump, for pressurizing the evaporative emission space; the latter may utilize either a devoted device, such as a vacuum pump, or engine manifold vacuum created by running of the engine.

Commonly owned U.S. Patents and Patent Applications disclose various systems, devices, modules, and methods for performing evaporative emission leak detection tests by positive and negative pressurization of the evaporative emission space being tested.

SUMMARY OF THE INVENTION

One general aspect of the invention relates to further improvements in leak detection systems and methods, including a novel system and method that requires neither intake manifold vacuum nor a devoted pumping device to create a pressure condition in an evaporative emission space suitable for performing a leak detection test.

Sensing of pressure (positive and negative) in an evaporative emission space is performed by one or more known devices. One known device is an electric sensor that provides measurements within a defined measurement range; another device may furnish a signal that switches when the sensed pressure passes through a switch point that is designed into the sensor. The latter device may have the capability for providing several different switch points at respective different pressures. Sensing of temperature in the evaporative emission space may be performed by a known temperature sensor that provides temperature measurements over a temperature range of interest.

A preferred embodiment of the inventive system and method employs a control device through which atmospheric venting of the evaporative emission space occurs. The control device defines limits for both positive pressure and negative pressure (i.e. vacuum) in the evaporative emission space.

One aspect of the invention is premised on an application of Charles' Law to a recognition that when an automotive vehicle that had previously been operating, is parked and its engine shut off, a vacuum that occurs naturally in the evaporative emission space under certain favorable ambient conditions can be used for leak detection. Recognition of the utility of that phenomenon for leak detection is believed to afford opportunity for economy in equipping a vehicle with an evaporative emission leak detection capability while enabling compliance with relevant criteria and/or regulation. Moreover, it may be considered advantageous for a leak detection test to be performed when the vehicle engine is not running.

Another general aspect of the invention relates to a method for detecting leakage from an evaporative emission space of an automotive vehicle fuel system that includes a tank for holding volatile liquid fuel, the method comprising: sensing each of plural physical parameters characterizing a gas mixture that includes volatized fuel, in the evaporative emission space; measuring a beginning value of a first of the sensed parameters at a beginning value of a second of the sensed parameters at a beginning test time; measuring an ending value of the first parameter at an ending value of the second parameter at an ending test time; deriving an actual measurement by processing the beginning and the ending values of the first parameter and the beginning and ending test times using a gas law that that correlates difference between the beginning and ending values of the first parameter, difference between the beginning and the ending test times, and difference between the beginning and the ending values of the second parameter; deriving a theoretical measurement that represents the value of an actual measurement that should obtain from the step of deriving the actual measurement in the absence of leakage from the contained volume; and comparing the derived actual measurement to the derived theoretical measurement.

Another general aspect of the invention relates to apparatus for detecting leakage from an evaporative emission space of an automotive vehicle fuel system that includes a tank for holding volatile liquid fuel, the apparatus comprising: first and second sensors for sensing respective ones of plural physical parameters characterizing a gas mixture, that includes volatized fuel in the evaporative emission space; and a processor for processing a beginning value of a first of the parameters obtained from the first sensor at a beginning value of a second of the parameters at a beginning test time, for processing an ending value of the first parameter obtained from the first sensor at an ending value of the second parameter at an ending test time, for deriving an actual measurement by processing the beginning and the ending values of the first parameter and the beginning and ending test times using a gas law that that correlates difference between the beginning and ending values of the first parameter, difference between the beginning and the ending test times, and difference between the beginning and the ending values of the second parameter, for deriving a theoretical measurement that represents the value of an actual measurement that should obtain from derivation of the actual measurement in the absence of leakage from the contained volume, and for comparing the actual measurement to the theoretical measurement.

Still another general aspect of the invention relates to a method for detecting leakage from a contained volume for holding volatile liquid, the method comprising: sensing each of plural physical parameters characterizing a gas mixture, including volatized liquid, in headspace of the contained volume; measuring a beginning value of a first of the sensed parameters at a beginning value of a second of the sensed parameters at a beginning test time; measuring an ending value of the first parameter at an ending value of the second parameter at an ending test time; deriving an actual measurement by processing the beginning and the ending values of the first parameter and the beginning and ending test times using a gas law that that correlates difference between the beginning and ending values of the first parameter, difference between the beginning and the ending test times, and difference between the beginning and the ending values of the second parameter; deriving a theoretical measurement that represents the value of an actual measurement that should obtain from the step of deriving the actual measurement in the absence of leakage from the contained volume; and comparing the derived actual measurement to the derived theoretical measurement.

Still another general aspect of the invention relates to apparatus for detecting leakage from a contained volume for holding volatile liquid, the apparatus comprising: first and second sensors for sensing respective ones of plural physical parameters characterizing a gas mixture, including volatized liquid, in headspace of the contained volume; and a processor for processing a beginning value of a first of the parameters obtained from the first sensor at a beginning value of a second of the parameters at a beginning test time, for processing an ending value of the first parameter obtained from the first sensor at an ending value of the second parameter at an ending test time, for deriving an actual measurement by processing the beginning and the ending values of the first parameter and the beginning and ending test times using a gas law that that correlates difference between the beginning and ending values of the first parameter, difference between the beginning and the ending test times, and difference between the beginning and the ending values of the second parameter, for deriving a theoretical measurement that represents the value of an actual measurement that should obtain from derivation of the actual measurement in the absence of leakage from the contained volume, and for comparing the actual measurement to the theoretical measurement.

One of several more specific aspects is characterized by the parameters including vapor temperature and vapor pressure.

Another more specific aspect is characterized by utilizing defined values of vapor pressure as a frame-of-reference base for conducting a conclusive leak test.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
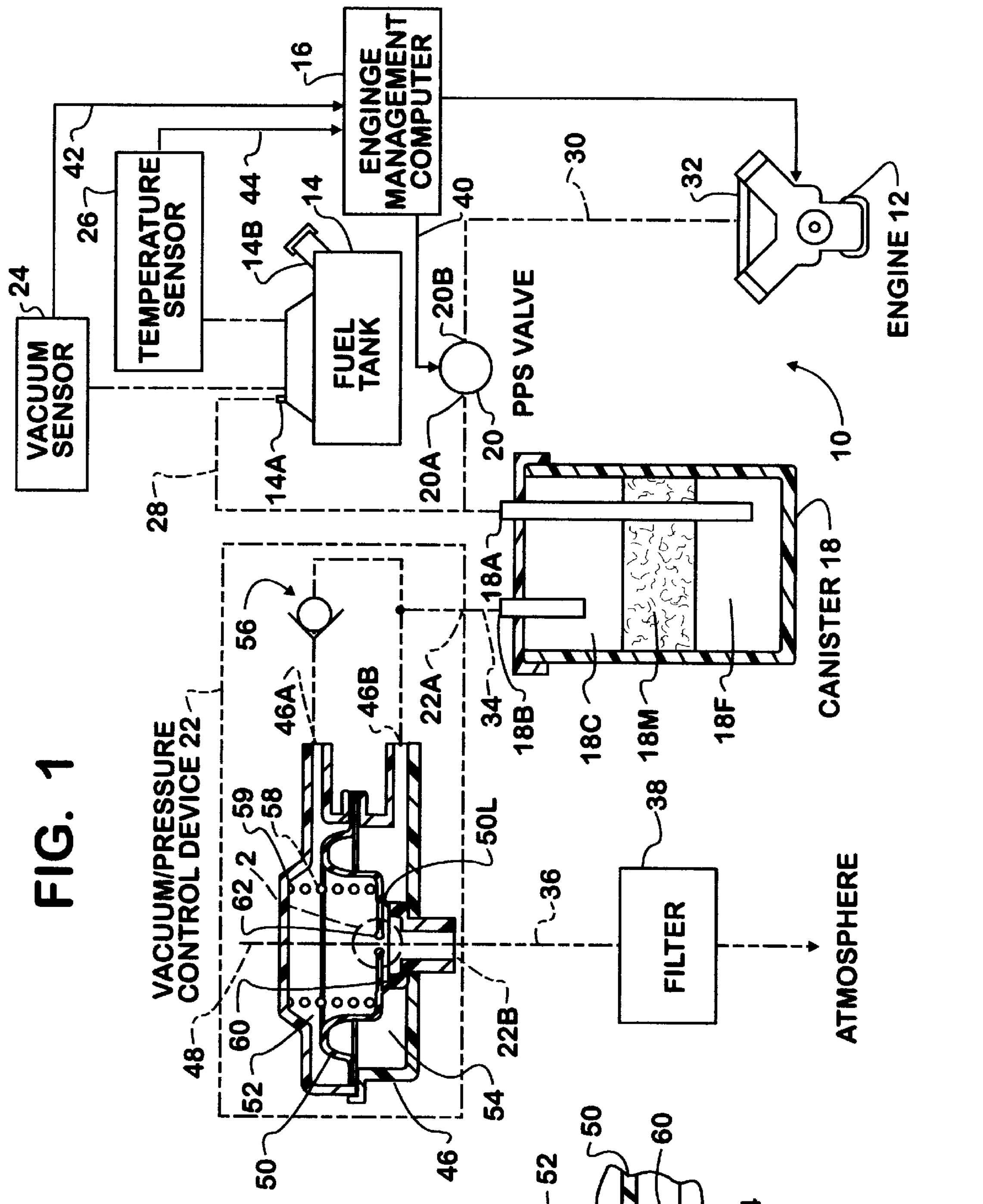
FIG. 1 is a general schematic diagram of an exemplary automotive vehicle evaporative emission control system including a leak detection system embodying principles of the invention.

FIG. 1 shows an automotive vehicle evaporative emission control (EEC) system 10 in association with an internal combustion engine 12 that powers the vehicle, a fuel system including a fuel tank 14 that holds a supply of volatile liquid fuel for the engine, and an engine management computer (EMC) 16 that exercises certain controls over operation of engine 12. EEC system 10 comprises a vapor collection canister (charcoal canister) 18, and a canister purge solenoid (CPS) valve, such as a proportional purge solenoid (PPS) valve, 20. Associated with EEC system 10 for performing a leak detection test on evaporative emission space of the fuel system are a vacuum/pressure control device 22, a vacuum sensor 24, and a temperature sensor 26. Although components that are portrayed in the illustrated schematic as discrete components may be appropriate subjects for integration with one or more other components, it should be understood that comprehensive principles of the invention are generic to various embodiments regardless of the extent to which components that are otherwise discrete may or may not be integrated with any other component or components.

A tank headspace port 14A that communicates with evaporative emission headspace of fuel tank 14, a tank port 18A of canister 18, and an inlet port 20A of PPS valve 20 are placed in common fluid communication by a conduit 28. Another conduit 30 fluid-connects an outlet port 20B of PPS valve 20 with an intake system of engine 12, such as an intake manifold 32. Another conduit 34 fluid-connects a port 22A of vacuum/pressure control device 22 to a vent port 18B of canister 18. Still another conduit 36 fluid-connects another port 22B of vacuum/pressure control device 22 to atmosphere via a particulate filter 38. The headspace of fuel tank 14, a portion of canister 18, and associated conduits collectively define an evaporative emission space of the fuel system within which fuel vapors generated by volatilization of fuel in tank 14 are temporarily confined and collected until purged to intake manifold 32 via opening of PPS valve 20. Canister 18 comprises a vapor adsorbent medium 18M that divides the canister interior into a fuel vapor zone 18F to which the fuel tank headspace is communicated via port 18A and a clean air zone 18C that is communicated via port 18B to control device 22. Medium 18M forms a fuel vapor barrier between zones 18F and 18C such that air, but not fuel vapors, can transpass through medium 18M.

EMC 16 receives a number of inputs relevant to control of certain operations of engine 12 and its associated systems, including EEC system 10. One electrical output port of EMC 16 controls PPS valve 20 via an electrical connection 40; one electrical input port of EMC 16 is coupled with vacuum sensor 24 via an electrical connection 42; and another electrical input port of EMC 16 is coupled with temperature sensor 26 via an electrical connection 44. EMC 16 selectively operates PPS valve 20 during certain times of engine running such that the valve opens under conditions conducive to purging and closes under conditions not conducive to purging, thereby selectively purging fuel vapors from the evaporative emission space to the manifold for entrainment with induction flow and ensuing combustion within the engine.

Vacuum/pressure control device 22 functions to limit both negative pressure (i.e. vacuum) and positive pressure within the evaporative emission space. Control device 22 comprises a generally cylindrical body 46 having an imaginary axis 48. Body 46 is closed except for the presence of several ports that are to be described. Intermediate opposite axial ends of body 46 is an imperforate movable wall, or diaphragm, 50 that divides interior space within body 46 into a first chamber space 52 and a second chamber space 54. Chamber space 52 communicates via a port 46A in body 46 through a one-way, or check, valve 56 to port 22A. Valve 56 is ported to allow gas flow from chamber space 52 to port 22A only when the pressure in chamber space 52 exceeds that at port 22A by more than a pressure at which valve 56 is designed to open. Otherwise the valve conducts no gas flow.

The outer margin of movable wall 50 is sealed to the side wall of body 46, and within chamber space 52, a helical coil compression spring 58 acts between a spring locator 59 in an end wall of body 46 and a central zone of wall 50 to urge wall 50 toward increasing the volume of chamber space 52 and decreasing the volume of chamber space 54. Port 22B provides a short passage that terminates on the interior of body 46 within chamber space 54 as a circular annular seat 60 that is coaxial with axis 48. In the condition depicted by FIG. 1, the central zone of wall 50 is being forced by spring 58 to seat on seat 60, closing port 22B to chamber space 54. Sealing of wall 50 to seat 60 is provided by an annular lip 50L formed as a part of the wall. Because chamber space 54 is open to port 22A through another port 46B in body 46, the closure of port 22B to chamber space 54 by wall 50 also closes port 22B to port 22A.

Figure 2:
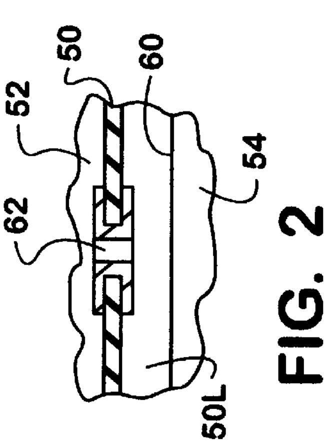
FIG. 2 is an enlarged view in circle 2 of FIG. 1.

The central zone of movable wall 50 that is circumscribed by lip 50L contains a through-orifice 62 (see FIG. 2) that provides restricted communication between port 22B and chamber space 52 when wall 50 is closing chamber space 54 to port 22B. Because essentially atmospheric pressure is applied to port 22B through filter 38 when control device 22 is in the condition portrayed by FIG. 1, essentially atmospheric pressure is applied to the central zone of wall 50 circumscribed by its sealing contact with seat 60 as well as to chamber space 52 via orifice 62. If the pressure in the evaporative emission control space is essentially atmospheric as well, then control device 22 will remain in the condition shown, with the pressure in chamber space 52 being essentially at atmospheric pressure also.

Should the evaporative emission space pressure start becoming increasingly positive, then an increasing pressure is applied to chamber space 54, acting on the annular portion of movable wall 50 that lies radially between seat 60 and the side wall of body 46. Once a certain pressure increase has occurred, the net force on movable wall 50 is sufficient to unseat wall 50 from seat 60, thereby allowing air to bleed from the evaporative emission space, through chamber space 54, through port 22B, and through filter 38 to atmosphere. In this way, control device 22 acts as a positive pressure limiter, limiting the positive pressure that can be developed within the evaporative emission control space to substantially a predetermined positive pressure, for example one inch water pressure. When limiting the positive pressure in this way, control device 22 effectively vents the evaporative emission space to atmosphere, and that is desirable at certain times, such as when tank 14 is being filled with fuel via a fill pipe 14B. In passing, it should be observed that so long as the pressure in the evaporative emission space remains positive, no flow can occur through one-way valve 56.

On the other hand, if control device 22 is in the condition shown by FIG. 1 and the pressure in the evaporative emission space begins to become increasingly negative relative to atmosphere due to increasing vacuum in the evaporative emission space, such increasing vacuum will tend to increase the force of wall 50 against seat 60. However, this is where orifice 62 and one-way valve 56 come into play. Because the pressure in chamber space 52 remains essentially at atmospheric pressure, the increasing evaporative emission space vacuum will, upon reaching a certain magnitude, cause valve 56 to begin to open. When that happens, air can flow from atmosphere, through filter 38, through port 22B, through orifice 62, through control chamber space 52, and through valve 56 to counter the increasing vacuum. In this way, control device 22 limits the magnitude of vacuum that can be developed in the evaporative emission space. For reasons that will be seen from further description relating to leak detection however, that limit is greater than certain vacuum magnitudes relevant to performance of such testing of the evaporative emission space. For example, that limit for evaporative emission space vacuum may be within a range of four to six inches water so that for vacuum magnitudes less than the limit, valve 56 remains closed.

From the foregoing description, it can be appreciated that control device 22 is effective to limit the positive pressure in the evaporative emission space substantially to a predetermined maximum (one inch water pressure for example) and also limit the vacuum substantially to a predetermined maximum (four to six inches water for example).

One of the tasks performed by EMC 16 is a leak detection test for ascertaining the integrity of EEC system 10, particularly the evaporative emission space that contains volatile fuel vapors, against leakage. In accordance with certain principles of the invention, such testing may be initiated after engine 12 has been turned off at the conclusion of a period of time during which the vehicle was operating. For example, turning the engine ignition system off by operating an ignition switch to Off position may initiate a leak detection test, possibly with a certain interval of time being allowed to elapse before actual testing begins so that any sloshing of liquid fuel in tank 14 can substantially dissipate. Performance of a test includes sensing both temperature and vacuum of fuel vapor in the fuel tank headspace by temperature sensor 26 and vacuum sensor 24 respectively.

Temperature sensor 26 is a commercially available device that provides an electric signal output indicative of sensed temperature. Ideally the sensor might be placed in direct contact with fuel vapor in the tank headspace, but such placement may be impractical for any of several different reasons. Moreover, because certain principles of the inventive methodology can utilize a differential temperature measurement, absolute temperature sensing may be rendered unnecessary. Therefore, it is possible for sensor 26 to be disposed external to the interior of tank 14, but in direct sensing contact with a wall of the tank that is expected to be exposed directly to fuel vapors in the tank headspace and that possesses good thermal conductivity. An example of a suitable placement is on a dome of a domed metal fuel tank, as shown in FIG. 1. An alternative placement could be at an appropriate location on a fuel sender unit that is assembled to the tank by insertion into, and closure of, a hole in a wall of the tank. With such sensor placement, a signal that reasonably correlates to actual fuel vapor temperature can be obtained. Such a fuel sender unit could also contain the pressure sensor, but alternatively the pressure sensor could be mounted by itself on the fuel tank in any suitable manner to properly sense pressure in the evaporative emission space.

According to certain of the inventive principles, vacuum sensor 24 serves to monitor a change in vacuum within the tank headspace. Hence, it may function either as a sensor that provides a measurement of vacuum over a range of interest or as a switch that is capable of sensing two different vacuum magnitudes within the range of interest. For accomplishing its purpose, sensor 24 must be placed in sensing relation to the tank headspace by any suitably appropriate mounting.

Figure 3:
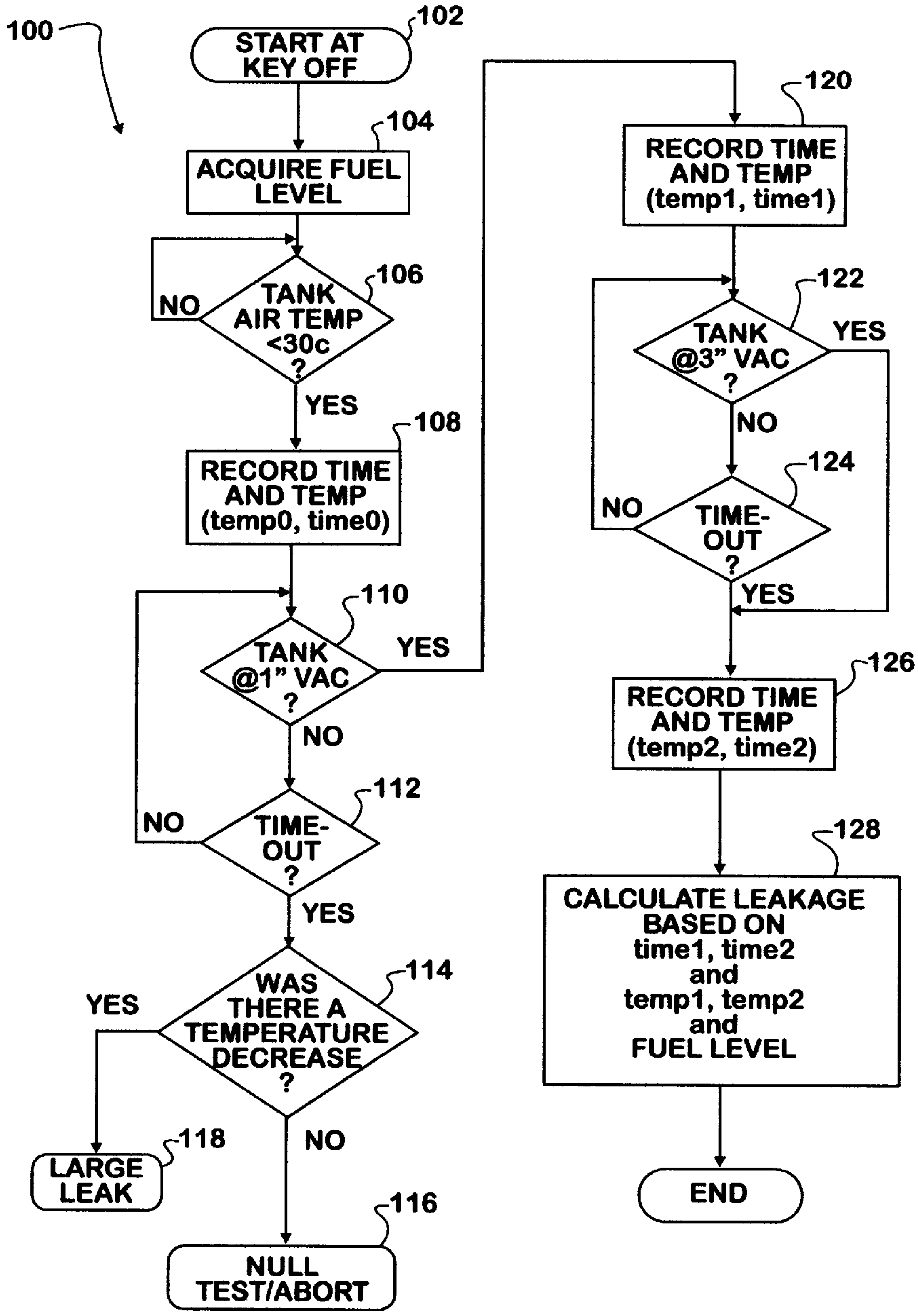
FIG. 3 is a schematic flow diagram of an exemplary method for performing a leak detection test using the system shown in FIG. 1.

FIG. 3 discloses a sequence of steps 100 that are executed during performance of a leak detection test according to the inventive method. Step 102 represents initiation of the test when the vehicle's ignition switch is turned off, such as by turning the usual ignition switch key to off position. Step 104 comprises acquiring the level of fuel in tank 14 for ascertaining the amount of liquid fuel in tank 14. Knowing the dry volume of the tank allows the headspace volume to be calculated by subtracting the measured liquid volume from the dry tank volume. Total volume of the evaporative emission space may be calculated by adding to the tank headspace volume other volumes that are in gaseous communication with the tank headspace.

The next step 106 comprises a measurement of fuel vapor temperature performed by EMC 16 reading temperature sensor 26, and a comparison of that measurement with a threshold temperature. It is believed that test validity is improved by requiring that the temperature be below a defined threshold, and it is further believed that a 30° C. threshold is an appropriate one when gasoline is the fuel. For certain vehicles it may also be desirable to set a lower temperature limit that the measured temperature must exceed before the test is allowed to proceed, but such a step is not specifically shown in the flow diagram of FIG. 3. Because this threshold is a fixed temperature, use of sensor 26 to furnish the temperature measurement would suggest that the sensor be mounted in such a manner that the signal which it provides correlate well with actual temperature. But if such a mounting is not possible, then it may be desirable to use a temperature measurement from a different temperature sensor that is suitable for ascertaining whether or not a proper temperature for allowing the test to proceed exists.

Once it has been determined that proper temperature for allowing the test to proceed exists, i.e. a temperature at or below 30° C. in the case of FIG. 3, the next step 108 comprises recording the temperature measured by sensor 26 and the time of making the recording.

At this juncture, it is appropriate to consider the theory upon which certain inventive principles are premised. If a vehicle has been operating for a time sufficient to have fully warmed up the vehicle, it is expected that the temperature of fuel in the tank will have been raised above the prevailing ambient temperature, particularly in temperate weather conditions. Therefore, when the engine is finally turned off, it is also expected that fuel in the tank will at some point begin to lose heat, i.e. to cool. If there is no leakage from the fuel system to atmosphere, Charles' Law holds that the vapor pressure in the fuel system will begin to decrease. If it is assumed that the vapor pressure in the fuel system was approximately at atmospheric pressure when the engine was turned off, and that no leakage existed, the ensuing cooling will create increasing vacuum in the tank headspace as the tank headspace temperature drops. In the absence of leakage, a well-defined relationship exists.

Continuing then with FIG. 3, the next step 110 involves a reading of vacuum sensor 24 by EMC 16 that recurs either until a defined beginning vacuum is measured (one inch water in the disclosed embodiment) or until a certain amount of time, as represented by step 112, has elapsed. Occurrence of the latter event will result in a step 114 comprising the acquisition of a further temperature measurement by EMC 16 reading temperature sensor 26 and a comparison of that temperature measurement with the temperature recorded at step 108. If the comparison shows a difference that is less than a defined amount, that result is indicative of conditions that are deemed inappropriate for obtaining a conclusive test result, and therefore the test is aborted without reaching a result, as indicated by step 116. If on the other hand the comparison shows a temperature difference that is greater than the defined amount, such result is indicative of a large, or gross, leak, in which case notation thereof is logged by EMC 16 and the test terminated (step 118).

Should step 110 detect a vacuum sensor reading of a one inch water vacuum before the time interval of step 112 has elapsed, then the test continues. Step 120 shows that when EMC 16 reads a one inch water vacuum signal from vacuum sensor 24, it also reads temperature sensor 26, recording that temperature reading and commencing a timing function, such as by either starting a timer or recording the present time given by a running clock. Hence, a first set of three items of correlated data are logged, namely a beginning temperature correlated to that of the gas mixture in the evaporative emission space, a beginning vacuum, or negative pressure, corresponding to a first switch point (one inch water) of vacuum sensor 24, and a beginning test time.

As the test proceeds, a step 122 is executed. That step comprises EMC 16 reading vacuum sensor 24 to ascertain if vacuum has increased to a defined magnitude greater than one inch water. A subsequent step 124 provides a defined time interval during which vacuum is expected to reach the defined greater magnitude (three inches water in the disclosed embodiment) if the test is eventually to be construed as valid. During that time interval, the vacuum sensor is repeatedly read, and if the defined greater magnitude is reached within the defined time interval, then an ending reading of temperature sensor 26 is taken along with a final time reading, as indicated by step 126. In that way, a second set of three more items of correlated test data are obtained, namely an ending temperature correlated to that of the gas mixture in the evaporative emission space, an ending vacuum, or negative pressure, corresponding to a second switch point (three inches water) of vacuum sensor 24, and an ending test time.

The first and second sets of the correlated test data are then processed in accordance with a known gas law, Charles' Law, to provide a test result that is presumed valid. Such processing is represented by step 128. Applying Charles' Law to an evaporative emission space that does not leak, and attributing the two inches water increase in vacuum entirely to ambient cooling, will define a corresponding temperature change that should have occurred. Such a temperature change can be pre-calculated and stored in memory of EMC 16, or it can be calculated by EMC based on Charles' Law using relevant factors. When leakage is present, its effective size is expected to be dependent at least to some degree on the volume of the evaporative emission space. That is why fuel level is a useful factor in determining the effective leak size, and is employed in step 128.

If no leak is present, time is not a factor in leakage detection. However, if there is leakage, then time becomes a factor because the larger the effective leak size, the longer the time required for the vacuum to increase from the beginning vacuum to the final vacuum, i.e. from one inch water vacuum to three inches water vacuum in the disclosed embodiment. Hence, applying knowledge of a) the headspace volume, and b) the actual time interval required to draw down the vacuum from one inch water to three inches water, to discrepancy between 1) the actual measured temperature change, and 2) the theoretical temperature change calculated by application of Charles' Law to the defined two inch water increase in vacuum, discloses the extent to which the leak affected the time required to draw down the vacuum, and hence is indicative of leakage. In point of fact, a reasonably accurate measurement of effective leak size can be obtained.

From the foregoing description, the reader may appreciate that because the particular vacuum sensor 24 that has been described conveniently provides two defined switch points, i.e. one inch water vacuum and three inches water vacuum, the disclosed embodiment of the inventive apparatus and method, by its use of the particular steps 110 and 122 in FIG. 3, may be characterized as operating over a "vacuum-based" frame of reference. It is contemplated that generic inventive principles, principles employing pressure (e.g. vacuum), temperature, and time as relevant parameters, may be practiced in embodiments that utilize one of the other parameters for a frame of reference.

Should the vehicle engine be restarted while a leakage test is in progress, the test will be terminated without completion. For example, if the ignition switch is turned from off position to On or Start position, a signal may issue to terminate further execution of the test. A test may also terminate if one of the time-out steps 112, 124 in fact times out. For example, starting and running of the engine may prevent evaporative emission space vacuum from reaching the three inch water vacuum setting of sensor 24, resulting in test termination that is considered inconclusive of any leak.

It is to be understood that because the invention may be practiced in various forms within the scope of the appended claims, certain specific words and phrases that may be used to describe a particular exemplary embodiment of the invention are not intended to necessarily limit the scope of the invention solely on account of such use.

What is claimed is:

1. A method for detecting leakage from an evaporative emission space of an automotive vehicle fuel system that includes a tank for holding volatile liquid fuel, the method comprising:

sensing each of plural physical parameters characterizing a gas mixture that includes volatized fuel, in the evaporative emission space;

measuring a beginning value of a first of the sensed parameters at a beginning value of a second of the sensed parameters at a beginning test time;

measuring an ending value of the first parameter at an ending value of the second parameter at an ending test time;

deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter;

deriving a theoretical measurement that represents the value of an actual measurement resulting from the step of deriving the actual measurement in the absence of leakage from the evaporative emission space; and comparing the derived actual measurement to the derived theoretical measurement.

2. A method as set forth in claim 1 in which the step of sensing each of plural physical parameters characterizing a gas mixture that includes volatized fuel, in the evaporative emission space comprises sensing pressure of the gas mixture and sensing temperature of the gas mixture.

3. A method as set forth in claim 2 in which:

the step of measuring a beginning value of a first of the sensed parameters at a beginning value of a second of the sensed parameters at a beginning test time comprises measuring the value of sensed temperature of the gas mixture at a beginning value of sensed pressure of the gas mixture at the beginning test time;

the step of measuring an ending value of the first parameter at an ending value of the second parameter at an ending test time comprises measuring the value of sensed temperature of the gas mixture at an ending value of sensed pressure of the gas mixture at the ending test time; and the step of deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter comprises processing the measured values of the sensed temperature of the gas mixture at the beginning and ending test times, the difference between the beginning and ending test times, and the difference between the beginning and ending values of sensed pressures of the gas mixture.

4. A method as set forth in claim 3 in which the step of processing the measured values of the sensed temperature of the gas mixture at the beginning and ending test times, the difference between the beginning and ending test times, and the difference between the beginning and ending values of sensed pressure of the gas mixture comprises processing the measured values of the sensed temperature of the gas mixture at the beginning and ending test times, the difference between the beginning and ending test times, and the difference between the beginning and ending values of sensed pressure of the gas mixture according to Charles' Law.

5. A method as set forth in claim 2 in which:

the beginning and ending values of the second parameter are defined by respective first and second switch points at which respective first and second switch functions are performed; and the step of sensing pressure of the gas mixture includes performing the first switch function when the sensed pressure of the gas mixture corresponds to the beginning value of the second parameter and performing the second switch function when the sensed pressure of the gas mixture corresponds to the ending value of the second parameter.

6. A method as set forth in claim 5 including the steps of defining the beginning test time as time at which the first switch function is performed and of defining the ending test time as time at which the second switch function is performed.

7. A method as set forth in claim 6 in which:

the step of measuring a beginning value of a first of the parameters at a beginning value of a second of the parameters at a beginning test time comprises measuring the value of sensed temperature of the gas mixture at the time of performance of the first switch function;

the step of measuring an ending value of the first parameter at an ending value of the second parameter at an ending test time comprises measuring the value of sensed temperature of the gas mixture at the time of performance of the second switch function;

the step of deriving the actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter comprises processing the measured beginning and ending values of sensed temperature of the gas mixture, the beginning and ending test times, and the difference between the beginning and ending values of the second parameter;

the step of deriving a theoretical measurement comprises deriving one of a theoretical measurement of the time required for pressure of the gas mixture to change from the pressure at which the first switch function is performed to the pressure at which the second switch function is performed for a given change in temperature of the gas mixture in the absence of leakage and a theoretical measurement of change in pressure of the gas mixture that would occur over a given time interval in the absence of leakage; and the step of comparing the derived actual measurement to the derived theoretical measurement comprises comparing the derived actual measurement to the one of the theoretical measurement of the time required for pressure of the gas mixture to change from the pressure at which the first switch function is performed to the pressure at which the second switch function is performed for a given change in temperature of the gas mixture in the absence of leakage and the theoretical measurement of change in pressure of the gas mixture that would occur over a given time interval in the absence of leakage.

8. A method as set forth in claim 7 in which the step of comparing the derived actual measurement to the derived theoretical measurement comprises comparing the derived actual measurement to the theoretical measurement of the time required for pressure of the gas mixture to change from the pressure at which the first switch function is performed to the pressure at which the second switch function is performed for a given change in temperature of the gas mixture in the absence of leakage.

9. A method for detecting leakage from a contained volume for holding volatile liquid, the method comprising:

sensing each of plural physical parameters characterizing a gas mixture, including volatized liquid, in headspace of the contained volume;

measuring a beginning value of a first of the sensed parameters at a beginning value of a second of the sensed parameters at a beginning test time;

measuring an ending value of the first parameter at an ending value of the second parameter at an ending test time;

deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter;

deriving a theoretical measurement that represents the value of an actual measurement resulting from the step of deriving the actual measurement in the absence of leakage from the contained volume; and comparing the derived actual measurement to the derived theoretical measurement.

10. A method as set forth in claim 9 in which the step of sensing each of plural physical parameters characterizing a gas mixture in headspace of the contained volume comprises sensing pressure of the gas mixture and sensing temperature of the gas mixture.

11. A method as set forth in claim 10 in which:

the step of measuring a beginning value of a first of the sensed parameters at a beginning value of a second of the sensed parameters at a beginning test time comprises measuring the value of sensed temperature of the gas mixture at a beginning value of sensed pressure of the gas mixture at the beginning test time;

the step of measuring an ending value of the first parameter at an ending value of the second parameter at an ending test time comprises measuring the value of sensed temperature of the gas mixture at an ending value of sensed pressure of the gas mixture at the ending test time; and the step of deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter comprises processing the measured values of the sensed temperature of the gas mixture at the beginning and ending test times, the difference between the beginning and ending test times, and the difference between the beginning and ending values of sensed pressures of the gas mixture.

12. A method as set forth in claim 11 in which the step of processing the measured values of the sensed temperature of the gas mixture at the beginning and ending test times, the difference between the beginning and ending test times, and the difference between the beginning and ending values of sensed pressure of the gas mixture comprises processing the measured values of the sensed temperature of the gas mixture at the beginning and ending test times, the difference between the beginning and ending test times, and the difference between the beginning and ending values of sensed pressure of the gas mixture according to Charles' Law.

13. A method as set forth in claim 10 in which:

the beginning and ending values of the second parameter are defined by respective first and second switch points at which respective first and second switch functions are performed; and the step of sensing pressure of the gas mixture includes performing the first switch function when the sensed pressure of the gas mixture corresponds to the beginning value of the second parameter and performing the second switch function when the sensed pressure of the gas mixture corresponds to the ending value of the second parameter.

14. A method as set forth in claim 13 including the steps of defining the beginning test time as time at which the first switch function is performed and of defining the ending test time as time at which the second switch function is performed.

15. A method as set forth in claim 14 in which:

the step of measuring a beginning value of a first of the parameters at a beginning value of a second of the parameters at a beginning test time comprises measuring the value of sensed temperature of the gas mixture at the time of performance of the first switch function;

the step of measuring an ending value of the first parameter at an ending value of the second parameter at an ending test time comprises measuring the value of sensed temperature of the gas mixture at the time of performance of the second switch function;

the step of deriving the actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter comprises processing the measured beginning and ending values of sensed temperature of the gas mixture, the beginning and ending test times, and the difference between the beginning and ending values of the second parameter;

the step of deriving a theoretical measurement comprises deriving one of a theoretical measurement of the time required for pressure of the gas mixture to change from the pressure at which the first switch function is performed to the pressure at which the second switch function is performed for a given change in temperature of the gas mixture in the absence of leakage and a theoretical measurement of change in pressure of the gas mixture that would occur over a given time interval in the absence of leakage; and the step of comparing the derived actual measurement to the derived theoretical measurement comprises comparing the derived actual measurement to the one of the theoretical measurement of the time required for pressure of the gas mixture to change from the pressure at which the first switch function is performed to the pressure at which the second switch function is performed for a given change in temperature of the gas mixture in the absence of leakage and the theoretical measurement of change in pressure of the gas mixture that would occur over a given time interval in the absence of leakage.

16. A method as set forth in claim 15 in which the step of comparing the derived actual measurement to the derived theoretical measurement comprises comparing the derived actual measurement to the theoretical measurement of the time required for pressure of the gas mixture to change from the pressure at which the first switch function is performed to the pressure at which the second switch function is performed for a given change in temperature of the gas mixture in the absence of leakage.

17. Apparatus for detecting leakage from a contained volume for holding volatile liquid, the apparatus comprising:

first and second sensors for sensing respective ones of plural physical parameters characterizing a gas mixture, including volatized liquid, in headspace of the contained volume; and a processor for processing a beginning value of a first of the parameters obtained from the first sensor at a beginning value of a second of the parameters at a beginning test time, for processing an ending value of the first parameter obtained from the first sensor at an ending value of the second parameter at an ending test time, for deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter, for deriving a theoretical measurement that represents the value of an actual measurement resulting from derivation of the actual measurement in the absence of leakage from the contained volume, and for comparing the actual measurement to the theoretical measurement.

18. Apparatus as set forth in claim 17 in which the first sensor provides the values of the first parameter as temperatures of the gas mixture, and the second sensor provides the values of the second parameter as pressures of the gas mixture.

19. Apparatus as set forth in claim 18 in which the processor derives the actual measurement by processing the beginning and ending test times, and respective values of temperature of the gas mixture sensed by the first sensor at respective values of pressure of the gas mixture sensed by the second sensor at the respective beginning and ending test times using a relationship that correlates difference between the respective values of sensed temperature of the gas mixture, difference between the beginning and the ending test times, and difference between the respective values of sensed pressure of the gas mixture.

20. Apparatus as set forth in claim 19 in which the processor derives the actual measurement using Charles' Law for the relationship.

21. Apparatus as set forth in claim 18 in which the second sensor performs respective first and second switch functions correlated to the respective beginning and ending values of the second parameter, performing the first switch function upon sensing pressure of the gas mixture attaining correspondence with the beginning value of the second parameter, and performing the second switch function upon sensing pressure of the gas mixture attaining correspondence with the ending value of the second parameter.

22. Apparatus as set forth in claim 21 in which the processor processes, as the beginning test time, the time at which the second sensor performs the first switch function and as the ending test time, the time at which the second sensor performs the second switch function.

23. Apparatus as set forth in claim 22 in which the processor derives the actual measurement by processing, as the beginning and the ending values of the first parameter, respective beginning and ending values of temperature of the gas mixture sensed by the first sensor at the respective beginning and ending test times using a relationship that correlates difference between the beginning and ending values of temperature of the gas mixture, difference between the beginning and the ending test times, and difference between the beginning and the ending values of pressure of the gas mixture sensed by the second sensor at the beginning and ending test times, and derives the theoretical measurement by processing difference between the beginning and the ending values of temperature of the gas mixture sensed by the first sensor, difference between beginning and ending test times, and difference between a value of pressure causing performance of the first switch function by the second sensor and a value of pressure causing performance of the second switch function by the second sensor.

24. Apparatus as set forth in claim 23 in which the processor compares the derived actual measurement to the derived theoretical measurement by comparison of the time required for pressure of the gas mixture to change from the pressure at which the first switch function is performed by the second sensor to the pressure at which the second switch function is performed by the second sensor for a given change in temperature of the gas mixture in the absence of leakage.

25. Apparatus for detecting leakage from an evaporative emission space of an automotive vehicle fuel system that includes a tank for holding volatile liquid fuel, the apparatus comprising:

first and second sensors for sensing respective ones of plural physical parameters characterizing a gas mixture, that includes volatized fuel in the evaporative emission space; and a processor for processing a beginning value of a first of the parameters obtained from the first sensor at a beginning value of a second of the parameters at a beginning test time, for processing an ending value of the first parameter obtained from the first sensor at an ending value of the second parameter at an ending test time, for deriving an actual measurement by processing the beginning and the ending values of the first parameter and the beginning and ending test times using a relationship that correlates difference between the beginning and ending values of the first parameter, difference between the beginning and the ending test times, and difference between the beginning and the ending values of the second parameter, for deriving a theoretical measurement that represents the value of an actual measurement resulting from derivation of the actual measurement in the absence of leakage from the evaporative emission space, and for comparing the actual measurement to the theoretical measurement.

26. Apparatus as set forth in claim 25 in which the first sensor provides the values of the first parameter as temperatures of the gas mixture, and the second sensor provides the values of the second parameter as pressures of the gas mixture.

27. Apparatus as set forth in claim 26 in which the processor derives the actual measurement by processing the beginning and ending test times, and respective values of temperature of the gas mixture sensed by the first sensor at respective values of pressure of the gas mixture sensed by the second sensor at the respective beginning and ending test times using a relationship that correlates difference between the respective values of sensed temperature of the gas mixture, difference between the beginning and the ending test times, and difference between the respective values of sensed pressure of the gas mixture.

28. Apparatus as set forth in claim 27 in which the processor derives the actual measurement using Charles' Law for the relationship.

29. Apparatus as set forth in claim 26 in which the second sensor performs respective first and second switch functions correlated to the respective beginning and ending values of the second parameter, performing the first switch function upon sensing pressure of the gas mixture attaining correspondence with the beginning value of the second parameter, and performing the second switch function upon sensing pressure of the gas mixture attaining correspondence with the ending value of the second parameter.

30. Apparatus as set forth in claim 29 in which the processor processes, as the beginning test time, the time at which the second sensor performs the first switch function and as the ending test time, the time at which the second sensor performs the second switch function.

31. Apparatus as set forth in claim 30 in which the processor derives the actual measurement by processing, as the beginning and the ending values of the first parameter, respective beginning and ending values of temperature of the gas mixture sensed by the first sensor at the respective beginning and ending test times using a relationship that correlates difference between the beginning and ending values of temperature of the gas mixture, difference between the beginning and the ending test times, and difference between the beginning and the ending values of pressure of the gas mixture sensed by the second sensor at the beginning and ending test times, and derives the theoretical measurement by processing difference between the beginning and the ending values of temperature of the gas mixture sensed by the first sensor, difference between beginning and ending test times, and difference between a value of pressure causing performance of the first switch function by the second sensor and a value of pressure causing performance of the second switch function by the second sensor.

32. Apparatus as set forth in claim 31 in which the processor compares the derived actual measurement to the derived theoretical measurement by comparison of the time required for pressure of the gas mixture to change from the pressure at which the first switch function is performed by the second sensor to the pressure at which the second switch function is performed by the second sensor for a given change in temperature of the gas mixture in the absence of leakage.

* * * * *